A. J. MEIER, W. L. SWIFT & E. L. RELLER.
PAPER FEED AND PLATEN OPERATING MECHANISM FOR CALCULATING MACHINES.
APPLICATION FILED MAR. 26, 1914.

1,134,694.

Patented Apr. 6, 1915.

Witnesses:
Harry H. Pierce
George G. Anderson

Inventors:
ALBERT J. MEIER, WILLIAM L. SWIFT, AND EDWIN L. RELLER,
By Hugh K. Wagner
Their Attorney.

A. J. MEIER, W. L. SWIFT & E. L. RELLER.
PAPER FEED AND PLATEN OPERATING MECHANISM FOR CALCULATING MACHINES.
APPLICATION FILED MAR. 26, 1914.

1,134,694.

Patented Apr. 6, 1915.

Witnesses:
Harry H. Reise
George G. Anderson

Inventors:
ALBERT J. MEIER, WILLIAM L. SWIFT, AND EDWIN L. RELLER,
By Hugh K. Wagner,
Their Attorney.

UNITED STATES PATENT OFFICE.

ALBERT J. MEIER, OF GLENDALE, AND WILLIAM L. SWIFT AND EDWIN L. RELLER, OF ST. LOUIS, MISSOURI, ASSIGNORS TO THE DUCO ADDING MACHINE COMPANY, OF ST. LOUIS, MISSOURI, A CORPORATION OF MISSOURI.

PAPER-FEED AND PLATEN-OPERATING MECHANISM FOR CALCULATING-MACHINES.

1,134,694.      Specification of Letters Patent.      Patented Apr. 6, 1915.

Original application filed April 13, 1912, Serial No. 690,514. Divided and this application filed March 26, 1914. Serial No. 827,439.

*To all whom it may concern:*

Be it known that we, ALBERT J. MEIER, WILLIAM L. SWIFT, and EDWIN L. RELLER, citizens of the United States, said ALBERT J. MEIER residing at Glendale, in the county of St. Louis, State of Missouri, said WILLIAM L. SWIFT residing at the city of St. Louis, State of Missouri, and said EDWIN L. RELLER temporarily residing at the city of St. Louis, State of Missouri, have invented certain new and useful Improvements in Paper-Feed and Platen-Operating Mechanisms for Calculating-Machines, of which the following is a specification.

This application is a division and continuation of one filed by us April 13, 1912, Serial No. 690,514.

The present invention relates to improvements in calculating machines and is more especially applicable to calculating machines of the type embodied in our aforesaid application, the present improvement being directed particularly to the paper-feed and platen-operating mechanism.

One of the objects of the present invention is to provide, in a calculating machine, improved mechanism for advancing the paper manually around the platen.

Another object of the present invention is to provide improved mechanism for advancing the paper sufficiently to bring the printed matter thereon into view and subsequently restoring the paper to its printing position.

A further object of the present invention is to provide improved mechanism for actuating the platen so as to advance the paper automatically for each printing operation.

With these objects in view, the present invention consists of the novel features of construction and arrangement of parts hereinafter more fully described and pointed out in the claims.

In the accompanying drawings forming part of this specification, in which like numbers of reference denote like parts wherever they occur.

In the following description, the several parts of the mechanism are referred to by the same reference numerals to agree with the corresponding parts shown in our above-mentioned application, and for the general description and operation of the machine reference is here made to that application.

Figure 1:
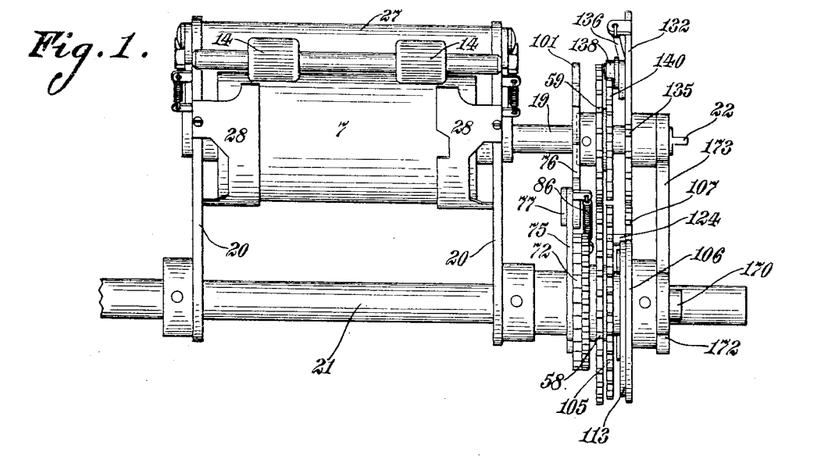
Figure 1 is a detailed front elevation of the platen and print shafts and parts associated therewith.
Figure 2:
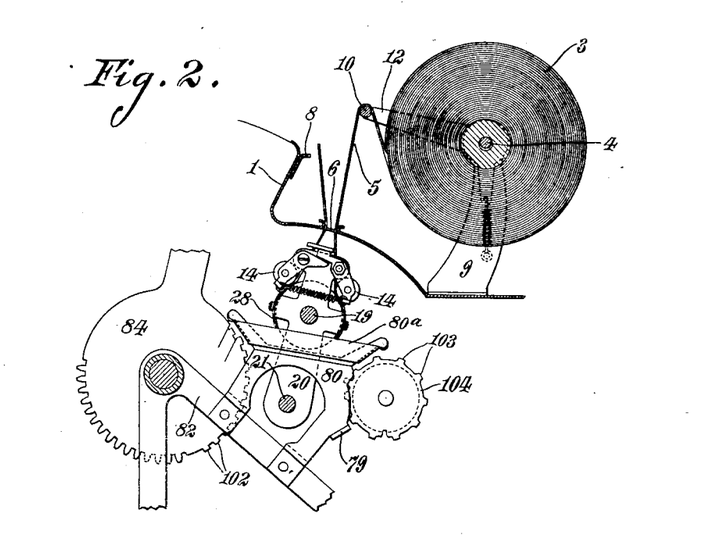
Fig. 2 is a sectional view of the platen, showing the paper in connection therewith.

The roll 3 of paper is preferably mounted above the machine on a suitable shaft 4, and the paper 5 feeds through a slot 6, Fig. 2, in the top plate of the casing 1 to the platen 7, and around same, and out through the same slot to a point adjacent to the knife 8, which is mounted on the casing 1, said shaft being detachably secured to a standard 9 or a plurality of such standards mounted on the top plate of casing 1, so that same can be removed to mount a fresh roll of paper thereon. Pieces of paper bearing separate amounts, tabulations, or totals can be torn off strip 5 by pulling said strip against knife 8. In order to keep the paper 5 taut, an idle rod 10 is kept pressed against same by means of a spring-controlled bell-crank equivalent means, said bell-crank or bell-cranks being pivotally mounted in the usual manner on said standard or standards 9. The platen 7 is rigidly mounted on a shaft 19, which is journaled in a pair of arms 20 rigidly mounted on the print shaft 21, and is adapted to swing with and to be operated by said arms. The shaft 19 extends beyond one of the arms 20 and terminates within a short distance of the right side plate of the casing, the end of same being provided with a projection or tongue 22, Figs. 1 and 6, which preferably extends transversely thereof for the purpose hereinafter described. One wing of a paper guide 27, Fig. 2, directs the course of the paper toward the platen at the time when the paper 5 reaches same, and another wing of said guide directs the paper 5 as it leaves the platen 7 toward the knife 8. While passing around the platen 7, the paper is directed in its course by a pair of guides 28 and is pressed against the platen by spring-controlled rollers 14 in he usual manner.

Figure 6:
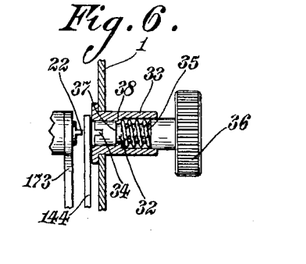
Fig. 6 is a sectional view of part of the casing, showing the manual paper-feeding device.
Figure 7:
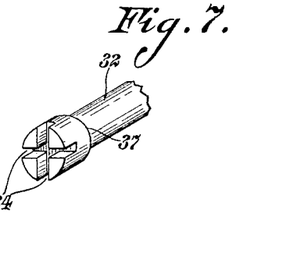
Fig. 7 is a detailed perspective view showing the grooved end of the manual paper-feeding device.

In order to afford a means for rotating the platen 7 for any necessary purpose, a rod 32, Figs. 6, and 7, is rotatably and reciprocatively mounted in a sleeve 33 that is preferably secured to the right side plate of casing 1 and is disposed in substantially axial alinement with the platen shaft 19, when the latter is in normal position. The inner end of rod 32 has a groove 34 or a plurality of such groves extending transversely thereof, so that, when the rod 32 is moved longitudinally toward the end of the platen shaft 19, the projection 22 on the end of the latter enters a groove 34 in the end of rod 32, whereby said shaft is caused to rotate with said rod when the latter is rotated. A spring 35 exerts its pressure against the shank of a knob 36 on the outer end of rod 32 and thereby tends to move said rod outwardly and to hold same in normal position, such outward movement of rod 32 being limited by the engagement of its shoulder 37 with an offset 38 in sleeve 33, so that, normally, the grooved end of said rod lies entirely within said sleeve, as best seen in Fig. 6. The knob 36 is utilized to effect the reciprocation of rod 32, in order to couple same to the platen shaft 19, and, also, the rotation of said rod, so as to rotate the platen 7 for any necessary purposes, such, for instance, as when it is desired to feed the paper forward to a certain position where a particular item or total will be presented in such position that it can be torn off by knife 8 or when a new roll of paper has just been placed on shaft 4.

Figures 3, 5:
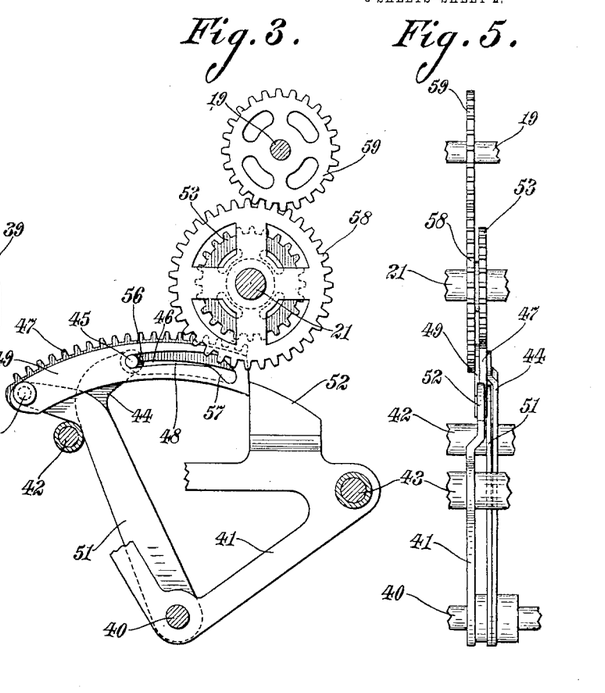
Fig. 3 is a diagrammatical view of the visible item mechanism.
Figs. 4 and 5 are, respectively, left and right elevations of same.
Figure 4:
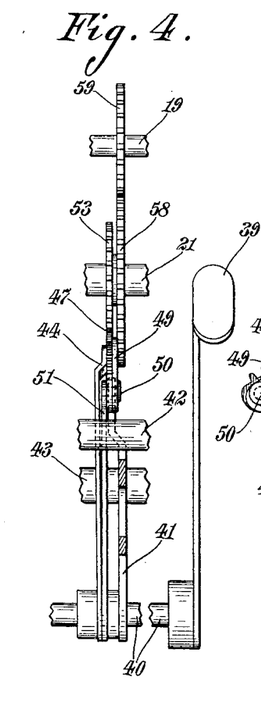

To make a particular item printed on paper 5 visible when desired, mechanism is provided which is controlled by a lever 39, Fig. 4, that is preferably located exteriorly adjacent the right side of casing 1. Said lever 39 is rigidly mounted on shaft 40, Figs. 3 to 5, which is journaled in the right side plate of casing 1 and, also, in the frame 41, the latter being preferably somewhat triangular-shaped and being supported by the cross-rods 42 and 43 that extend from one side to the other of casing 1. When the lever 39 is pushed in the direction away from where the operator normally stands in front of the machine, same causes the shaft 40 to rotate clockwise, Fig. 3, said shaft, in turn, causing the arm 44 rigidly mounted thereon to rotate therewith. A pin 45 borne by arm 44 protrudes through a slot 46 in a segmental rack 47 and, also, through a slot 48 in an arcual plate 49, said rack and plate being pivotally attached at 50 to an arm 51 that is loosely mounted on shaft 40, and said slots being disposed substantially opposite each other. Said pin 45 normally seats in the rear ends of the slots 46 and 48 in rack 47 and plate 49, respectively, and holds said rack and plate normally in a position in which the forward ends of same stand directly behind the projection 52 on frame 41 and, also, holds said rack normally out of engagement with the pinion 53, which is rotatably mounted on shaft 21. The projection 52 on frames 41 normally prevents the rack 47 and plate 49 from being moved forwardly by pin 45 borne by arm 44, and is preferably arcuated, in order to allow said rack 47 and plate 49 to pass thereover and in close proximity thereto after said rack and plate have been raised sufficiently by said pin, in the manner about to be described. A spring 54, Fig. 12, attached to cam-plate 55 rigidly mounted on shaft 40 returns and retains the lever 39 and parts actuated thereby to and in their normal positions when said lever is released, such return movement being limited by the engagement of arms 44 and 51 with the cross-rod 42, as depicted in Fig. 3. When the lever 39 is pushed away from the operator and thereby rotates shaft 40 clockwise, Fig. 3, the arm 44 moves toward the right and causes the pin 45 to travel forwardly in the slots 46 and 48 in rack 47 and plate 49, respectively. This forward movement of pin 45 causes same to move out of the inclined rear end 56 of slot 46 and thereby raises the forward end of said rack sufficiently to bring the teeth of said rack into engagement with the pinion 53, at the same time raising the forward end of said rack sufficiently to pass over the projection 52 on frame 41. This raising of the rack 47 into engagement with pinion 53 brings same into a position in which the forward part of slot 46 is substantially concentric to the shaft 40, so that the remainder of the forward travel of pin 45 in said slot holds said rack into engagement with said pinion. The rear part of the slot 48 is normally concentric to the shaft 40, so that, when the pin 45 travels forwardly and raises the rack 47, as just described, simultaneously, said pin travels forwardly in the concentric part of slot 48 and thereby holds the plate 49 in such position that its forward end remains behind the projection 52 on frame 41 until after the rack 47 has been raised into engagement with the pinion 53, at which time the pin 45 enters the declined forward end 57 of slot 48 and thereby raises the forward end of plate 49 sufficiently to pass over the projection 52. The pin 45 reaches the forward ends of slots 46 and 48 simultaneously, and then travels farther in the same direction, thereby drawing the rack 47, plate 49, and arm 51 forwardly, with the result that said rack and plate move over and closely to the arcuated projection 52, and said rack rotates the pinion 53 counter-clockwise, Fig. 3. A gear 58, rotatably mounted on shaft 21 and secured to pinion 53 by any suitable means, rotates with said pinion and drives a gear 59, which is rigidly mounted on the platen shaft 19. When the pinion 53 is rotated counter-clockwise, Fig. 3, the gear 58 rotates therewith and drives the gear 59 clockwise, whereby the shaft 19 and platen 7 rotate with said gear 59, with the result that said platen feeds the paper forwardly. Thus, the forward movement of lever 39 causes rotation of platen 7 to such extent as is necessary to disclose any item printed on paper 5, and, thereafter, to retract the paper when the lever is released, so as to allow same to return to its normal position. Naturally, it will be unnecessary to feed the paper by means of lever 39 farther forward than to display to the operator the last item printed, and, therefore, the cross-rod 43 is predeterminedly arranged to limit automatically the forward movement of arm 44, thereby limiting the forward movement of rack 47, so as to limit the forward feed of the paper to the extent just mentioned. The curvature of the lower edges of rack 47 and plate 49 is so arranged relative to the curvature of the arcuate projection 52 that when said rack and plate have reached the limit of this forward movement as just described, the lower edges of same bind sufficiently upon said projection as to hold said rack 47 and plate 49 in such position in case the operator releases the lever 39. By this means the paper 5 is retained in position to display any item printed thereon, thus allowing the operator to release the lever 39 for any reason, such as to copy any printed item if desired.

In order to retract the paper 5 after same has been fed forward by the lever 39, the lever is pulled a short distance toward the operator, so as to move the rack 47 and plate 49 out of binding engagement with the projection 52 on frame 41, after which said lever may be released, whereupon the pull of spring 54 on cam-plate 46 causes the shaft 40 to rotate counter-clockwise, Fig. 3, and thereby returns said lever to its initial position. As the rack 47 and plate 49 lie so close to the arcuated surface of projection 52 on frame 41 that the pin 45 is prevented from moving out of the forward ends of slots 46 and 48 until said rack and plate have been returned to a position in which the forward ends of same can be lowered into their normal positions behind said projection, the arms 44 and 51 return simultaneously with shaft 40 until the arm 51 reaches its normal position of rest against the cross-rod 42, after which the arm 51 remains stationary and holds the rack 47 and plate 49 in such position as to allow the forward ends of same to be lowered behind the projection 52. The arm 44 continues on its return movement with shaft 40 and thereby moves the pin 45 through the slots 46 and 48 in rack 47 and plate 49, respectively, until said arm rests against the cross-rod 42 and said pin seats in the rear ends of said slots, with the result that said pin first lowers the forward end of plate 49 into its normal position behind the projection 52 and then lowers the forward end of rack 47 into its initial position behind said projection, thereby moving said rack out of engagement with pinion 53. The return movement of rack 47 rotates the platen shaft 19 counter-clockwise, Fig. 3, through the intermediation of pinion 53, and gears 58 and 59, whereby the platen 7 returns the paper 5 to the same position which the latter occupied previous to being fed forwardly by lever 39, as hereinabove described. Thus, the rack 47 affords a positive means for rotating the platen 7 to such extent as is necessary to disclose any item printed on paper 5, and, thereafter, to retract the paper. Due to the fact that, on the return movement of rack 47, same is brought to a positive stop before being moved out of engagement with pinion 53, said pinion is thereby prevented from spinning, and the paper is returned to the same position which it occupied previous to being moved forwardly by lever 39.

Figures 12, 14:
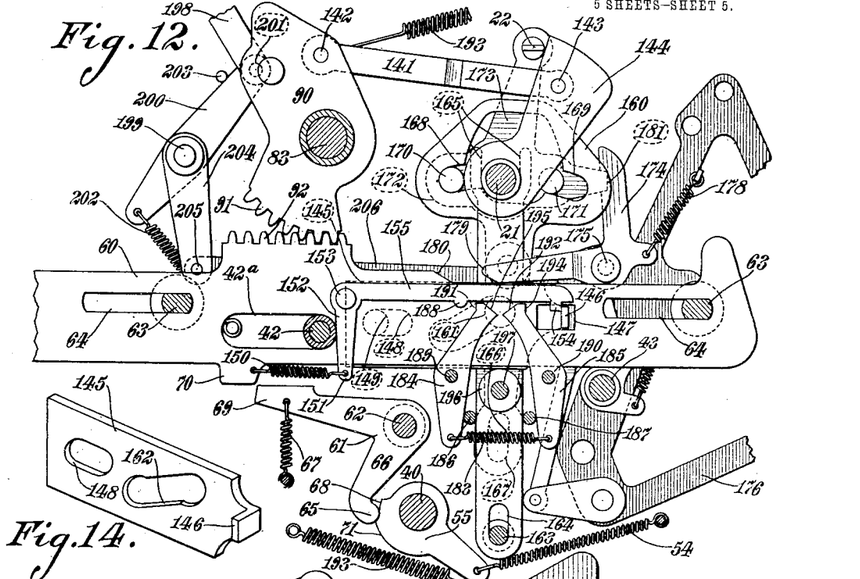
Fig. 12 is a diagrammatical view showing the platen-operating mechanism in side elevation.
Fig. 14 is a detailed perspective view of the slidable plate of the platen-operating mechanism.

In order to prevent the main operating bar 60, Fig. 12, from being operated while the paper 5 is being advanced and retracted by the lever 39, a bell-crank 61 is provided and is pivotally attached at 62 to the right side plate of casing 1, said operating bar being mounted so as to reciprocate longitudinally and being supported and guided by the studs 63 that project from the right side plate of casing 1 into slots 64 in said operating bar. Said operating bar contains, also, a slot 42ª to allow the cross-rod 42 to extend therethrough. The end 65 of the arm 66 of bell-crank 61 is preferably rounded and is drawn toward the cam-plate 55 by means of spring 67, said end normally resting against the low side 68 of the cam-plate 55, so that the other arm 69 of said bell-crank occupies such position as to allow the projection 70 borne by the operating bar 60 to pass thereover. When the lever 39 is pushed away from the operator, in order to advance the paper sufficiently to display any item printed on the latter as hereinabove described, the cam-plate 55 rotates with shaft 40 clockwise, Fig. 12, and thereby causes the rounded end 65 of arm 66 to ride out of engagement with the low sdie 68 of cam-plate 55 and into engagement with the high side 71 of said cam-plate, thus rotating bell-crank 61 clockwise. This movement of bell-crank 61 results in raising its arm 69 into a position in front of the projection 70 on operating bar 60, so as to lock said operating bar in its normal position, thereby preventing same from being moved until the lever 39 is returned to its initial position.

Figure 8:
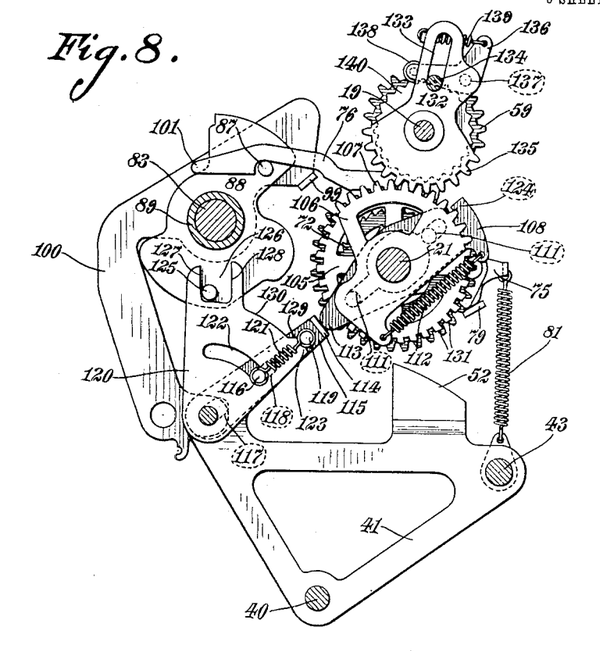
Figs. 8 and 9 are diagrammatical views of the normal paper-feeding mechanism, looking at opposite sides thereof.
Figure 9:
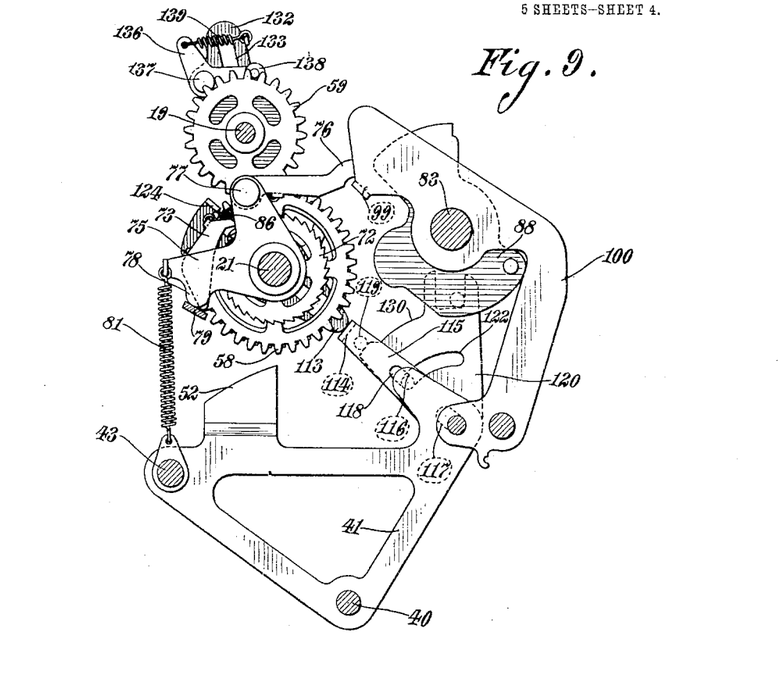
Figure 10:
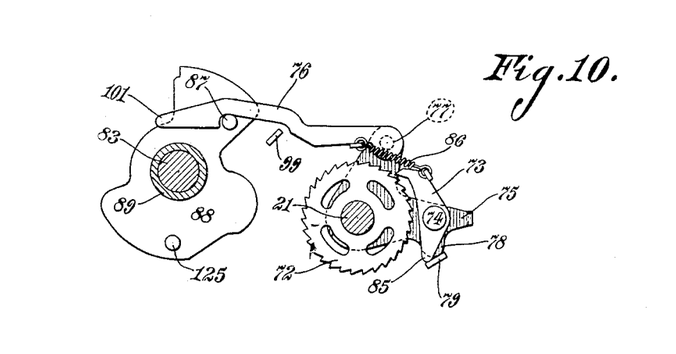
Fig. 10 is a diagrammatical view showing the normal relation between the paper-feeding ratchet and its pawl.

The normal paper-feeding operation, which precedes each printing impact upon 5, is produced by the actuation of shaft 19 by means of ratchet 72, Figs. 8 to 10, which is actuated by pawl 73, said ratchet being rotatably mounted on shaft 21 and secured to gear 58, so as to rotate therewith, and said pawl being pivoted at 74 to plate 75, which is rotatably mounted on shaft 21. Said plate 75 is preferably in the form of a bell-crank, one arm of which carries a hook 76, which is pivotally attached at 77 thereto, and the other arm of which bears a projection 78, which is held normally in engagement with the projection 79 on ribbon-guide 80 by means of spring 81. Said ribbon-guide is secured to a frame 82, Fig. 2, which is supported by shaft 83 and the cross-rods 42 and 43. The sectors 84 are rotatably mounted on the shaft 83, and are operated in the usual manner by the finger-pieces (not shown). The end 85 of pawl 73, also, normally rests on the projection 79 on ribbon-guide 80 and thereby holds the nose of said pawl out of engagement with the ratchet 72, in order to allow the platen to be rotated in either direction by the hand paper-feeding mechanism or by the item-displaying mechanism, as hereinabove described. A spring 86 connecting pawl 73 with hook 76 not only holds said hook in engagement with pin 87 borne by cam-plate 88, which is rotatably mounted on shaft 83, but draws the nose of pawl 73 into engagement with ratchet 72 when the plate 75 is rotated so as to move the end 85 of said pawl out of engagement with the projection 79 on ribbon-guide 80. The cam-plate 88 is secured to the hub 89 of plate 90, Fig. 12, which is revolubly mounted on shaft 83, and is adapted to rotate therewith. Said plate 90 bears a segmental rack 91 that meshes with a rack 92 on bar 60, in order to actuate said bar for the purpose hereinafter described. The shaft 83 has the main operating handle or lever (not shown) revolubly mounted on its outer end and the pin 95 borne by the plate 90 has the usual connection with the operating handle or lever, so that, when the latter is depressed the plate 90 will be rocked on said shaft, whereby the segmental rack 91 borne by said plate causes the operating bar 60 to move away from the operator, and the hub 89 of said plate causes the cam-plate 88 to rock counter-clockwise, Fig. 10, whereby pin 87 borne by said cam-plate 88 moves toward the left and draws the hook 76 with same. This movement of hook 76 rocks plate 75 counter-clockwise on shaft 21 and thereby moves the pawl 73 out of engagement with the projection 79 on ribbon-guide 80, whereupon spring 86 immediately draws the nose of said pawl into engagement with ratchet 72, thereby causing said pawl so to push against a tooth of the ratchet 72 as to rotate said ratchet forward a predetermined distance, whereby the latter drives the platen 7 forward through the medium of gears 58 and 59, with the result of feeding the paper 5 forward. A projection 99, Fig. 8, borne by frame 100, which is supported by cross-rod 42 and shaft 83, is disposed in the path of travel of an inclined surface 76ª on hook 76, so that, when said hook has rotated the plate 75 forward to such extent as is necessary to advance the paper 5 sufficiently to allow the next item or total to be printed thereon, the hook 76 rides upon the projection 99, which, in turn, raises said hook sufficiently to release pin 87. As soon as hook 76 releases pin 87, the spring 81 immediately returns the plate 75 to its normal position, thereby causing the pawl 73 to ride over the teeth of ratchet 72 until the end 85 of said pawl rests upon the projection 79 on the ribbon-guide 80, so as to hold the nose of said pawl out of engagement with said ratchet for the purpose hereinabove described. While the plate 75 returns the pawl 73 to its initial position, the ratchet 72 remains in the position to which same was moved by said pawl. After the hook 76 is released from the pin 87, the extension 101 on the end of said hook rests on the pin 87 during the remainder of the forward movement of said pin and, also, until said pin returns to its initial position, whereupon spring 86 causes said hook to catch upon said pin.

Figure 11:
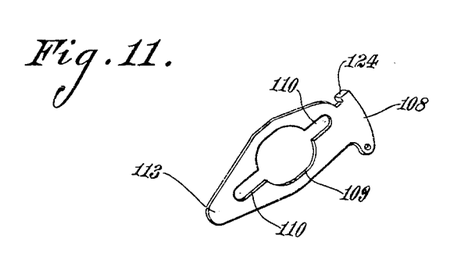
Fig. 11 is a detailed perspective view of one of the parts of the paper-feeding mechanism.

In order to prevent forward feed of the paper during the time when the platen 7 is being swung to printing position, either toward item type-faces 102 borne by sectors 84, or toward the type-faces 103 borne by the accumulator wheels 104, an additional ratchet 105, Figs. 8 and 9, is provided, same being revolubly mounted on shaft 21 and being secured to gear 58, so as to rotate therewith. A member 106 bearing a segmental rack 107 is revolubly mounted on shaft 21, and carries a plate 108, Fig. 11, which is mounted thereon so as to reciprocate transversely of said shaft. Said plate 108 contains an elongated opening 109 to allow the shaft 21 to extend therethrough and, also, slots 110 through which studs 111 borne by member 106 extend for the purpose of guiding the movement of said plate and, also, for attaching same to said member. A spring 112 holds the rounded end 113 of plate 108 normally in engagement with a lip 114, Fig. 8, on member 115, the latter being supported by cross-rod 42 and pin 116 borne by frame 41. Said member 115 is mounted to slide toward and away from shaft 21, and contains slots 117 and 118, through which cross-rod 42 and pin 116, respectively, extend in order to guide the movement of said member. A pin 119 borne by member 115 is held in engagement with the cam-plate 120 by means of spring 121, said cam-plate being revolubly mounted on cross-rod 42 and containing an arcuate slot 122 through which pin 116 extends for the purpose of limiting the movement of same. Said pin 119 normally rests against a projection 123, Fig. 8, on cam-plate 120, whereby member 115 holds the plate 108 in such position as to hold the projection 124 on plate 108 out of engagement with the teeth of ratchet 105, in order to allow the gear 58 to be rotated to feed the paper forwardly, as hereinabove described. A pin 125 borne by cam-plate 88 projects into a relatively wide and deep notch 126 in the cam-plate 120 and normally engages the side 127 of said notch, thereby holding said cam-plate 120 normally in the position depicted in Fig. 8. When the cam-plate 88 is rotated counter-clockwise, Fig. 8, by the depression of the main operating handle or lever as hereinabove described, the pin 125 moves away from the side 127 of said notch and travels toward the right through said notch until same comes in contact with the opposite side 128 of said notch, after which the remainder of the forward movement of pin 125 rocks the cam-plate 120 clockwise on cross-rod 42. The notch 126 being relatively deep prevents the pin 125 from moving out of same at the completion of the forward movement of cam-plate 88, so that, when the cam-plate 88 is returned to its normal position by the return movement of the main operating handle or lever, the pin 125, by exerting pressure against the side 127 of notch 126 returns the cam-plate 120 to its initial position. While the pin 125 moves forwardly through the notch 126, i. e., from the side 127 to the side 128, the pin 87 causes the hook 76 to feed the paper forwardly through the instrumentality of plate 75, pawl 73, ratchet 72, and gears 58 and 59 as hereinabove described. Just previous to the completion of the forward feed of the paper, the pin 125 engages the side 128 of notch 126 and causes the cam-plate 120 to rock clockwise, Fig. 8, thereby moving the projection 123 away from pin 119, with the result that spring 121 causes the pin 119 to ride down the inclined surface 129 on cam-plate 120 and, then, to rest on the arcuate surface 130 on said cam-plate. This movement of pin 119 causes the member 115 to move with same, whereby the spring 112 causes the plate 108 to follow said member, thus moving the projection 124 on said plate into engagement with ratchet 105. The crowns of the teeth 131 of ratchet 105 are preferably arranged to slant as clearly illustrated in Fig. 8, so that, when the projection 124 moves toward the ratchet 105 and engages the slanting crown of a tooth 131, the remainder of the forward rotation of said ratchet causes said projection 124 to ride down the slanting crown of said tooth until same enters the space between said tooth and the next tooth adjacent thereto, thereby connecting member 106 with ratchet 105 and consequently with gear 58 for the purpose hereinafter described. Immediately after the member 106 is connected with ratchet 105, the hook 76 releases the pin 87, whereupon the spring 81 returns plate 75 and pawl 73 to their initial positions, as hereinabove described, and then the shaft 21 is rocked either counter-clockwise, Fig. 8, in order to cause the arms 20 to swing the platen 7 toward the item type-faces 102, or clockwise, so as to cause the arms 20 to swing the platen 7 toward the accumulator type-faces 103 by mechanism operated by the bar 60 in the manner hereinafter described.

A member 132, Fig. 8, revolubly mounted on shaft 19 contains an elongated slot 133 into which a pin 134 projects from the casing 1, and bears a segmental rack 135 which meshes with the segmental rack 107 borne by member 106, said pin being stationarily attached to said casing. The pin 134 normally prevents the member 132 from rotating on shaft 19 and holds same in the position depicted in Fig. 8, but when the shaft 21 is rocked and the arms 20 borne by same swing the platen to printing position, the pin 134 causes the member 132 to rock, whereby said member causes the shaft 19 to rotate through the intermediation of member 106, plate 108, ratchet 105 and gears 58 and 59 sufficiently to present the lower side of the platen 7, i. e., the print point on the platen, either to the type-faces 102, or to the type-faces 103. For example, if the shaft 21 is rocked counter-clockwise, Fig. 8, the arms 20 swing the platen 7 from normal position toward the left, and the pin 134 causes the member 132 to rock clockwise, whereby said member rotates the shaft 19 clockwise through the medium of member 106, plate 108, ratchet 105, and gears 58 and 59 sufficiently to present the lower side or print point on platen 7 to the item type-faces 102 on sectors 84, but, if the shaft 21 is rocked clockwise, the arms 20 swing the platen 7 from normal position toward the right, and the pin 134 causes the member 132 to rock counter-clockwise, with the result of rotating the shaft 19 counter-clockwise through the medium of member 106, plate 108, ratchet 105, and gears 58 and 59 sufficiently to present the lower side or print point on platen 7 to the type-faces 103 on the accumulator wheels 104. While the platen 7 is rotated to present its lower side or print point either to the type-faces 102 or type-faces 103, the paper 5 moves with same, and after the printing operation takes place and the operating bar 60 reaches the end of its forward movement, the main operating handle or lever is allowed to return to its initial position in the usual manner, whereby the segmental rack 91 on plate 90 returns the bar 60 to normal position, thus rocking shaft 21 to its normal position as hereinafter described. This return movement of shaft 21 to normal position causes the arms 20 to swing the platen 7 from printing to normal position, whereby pin 134 causes the member 132, through the medium of member 106, plate 108, ratchet 105, and gears 58 and 59, to restore the platen 7 and paper 5 to the position from which same were moved immediately after the operation of feeding the paper forwardly as hereinabove described. The plate 108 rotates with member 106, ratchet 105, and gear 58 and thereby moves its rounded end 113 away from the projection 114 on member 115, when the platen is swung from normal to printing position, but, when the platen is swung from printing to normal position, the plate 108 returns to the position from which same was rotated, after which the cam-plate 88 returns to normal position, whereby the pin 125 returns the cam-plate 120 to its normal position, with the result that pin 119 rides along the arcuate surface 130 on cam-plate 120 and then up the inclined surface 129 until same rests upon the projection 123 on said cam-plate 120. This movement of pin 119 causes the member 115 to move toward shaft 21 and thereby causes the projection 114 on said member to press against the rounded end 113 of plate 108, so as to return said plate to its initial position, thus moving the projection 124 out of the space between two adjacent teeth 131 of ratchet 105, in order to allow the paper 5 to be fed forwardly when the main operating handle or lever is again depressed. A member 136, Fig. 8, preferably having the form of a bell-crank is pivoted at 137 to member 132 and carries a roller 138, which is rotatably attached thereto. A spring 139 holds the roller 138 in engagement with the serrated periphery of a wheel or ratchet 140 that is secured to the gear 59, so as to rotate therewith, and, when the platen shaft 19 is rotated, said roller rides on the serrated periphery of said wheel or ratchet and thereby affords sufficient drag to prevent the platen 7 from spinning.

Figure 13:
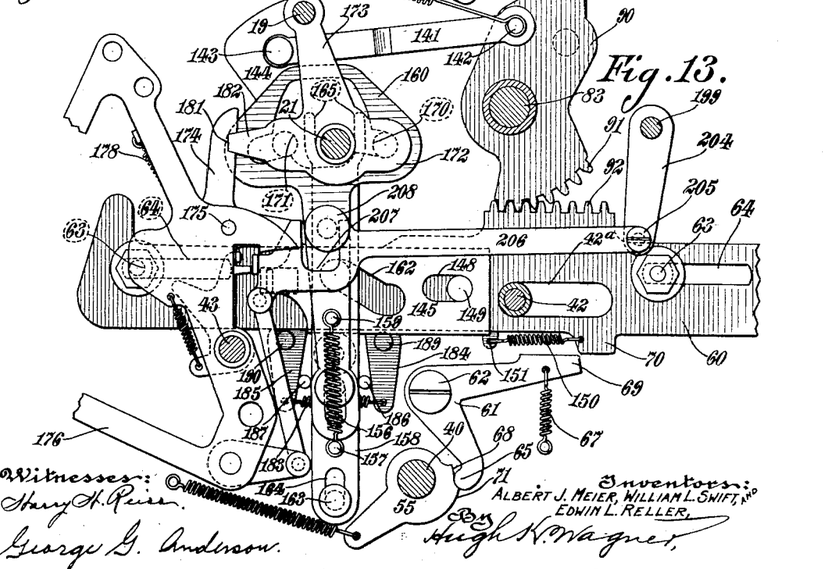
Fig. 13 is a similar view of same looking at the opposite side thereof.

A link 141, Fig. 12, is attached by pin 142 to plate 90 and, also, by stud 143 to plate 144, which is revolubly mounted on shaft 21, and, when the plate 90 is rocked as just described, the link 141 moves with same and thereby rocks the plate 144 toward the left, Fig. 12, so as to move said plate 144 into the space between the projection 22 on the end of shaft 19 and the grooved end of rod 32, thus, preventing, for the time being, said rod from being connected to the end of said shaft for the purpose of normally rotating the platen 7 as hereinabove described. Simultaneously with the operation just described, which renders the rod 32 temporarily inoperative, the aforesaid movement of the main operating handle or lever causes the segmental rack 91 on plate 90 to actuate rack 92 on bar 60. This movement of segmental rack 91 causes bar 60 to travel in the direction away from the operator, thereby causing the projection 70 on said bar to move over the arm 69 of bell-crank 61, so as to prevent, for the time being, the use of lever 39 and the accompanying movement and exhibition of printed items. A plate 145, Figs. 12 and 13, which is slidably mounted against one side of bar 60, bears a projection 146, which extends through a slot 147 in said bar, and contains a slot 148 into which a pin 149 projects from said bar. The projection 146 and pin 149 support plate 145 and the slots 147 and 148 guide the movement of same. A spring 150 is attached to the arm 151 of a bell-crank 152, Fig. 12, which is pivoted at 153 to bar 60, and tends to rotate said bell-crank clockwise, Fig. 12, so as to hold the projection 154 on the arm 155 of said bell-crank in engagement with one side of projection 146 on plate 145, thereby holding plate 145 normally in the position depicted in Fig. 12, so that, when bar 60 is moved forward, the projection 154 on arm 155 pushes against projection 146 on plate 145 and thereby causes said plate to travel forward with said bar. A spring 156, Fig. 13, is fastened by pin 157 to plate 158 and by pin 159 to link 160. A pin 161, borne by plate 158, extends into a cam slot 162 in plate 145 and normally holds plate 158 in such position that stud 163, Figs. 12 and 13, projecting from one side of casing 1, is seated at the lowest point of slot 164 in said plate 158 and, also, that shaft 21 is seated at the lowest point between the forks 165 of the bifurcated upper end of said plate 158, the pull of spring 156 tending, also, to retain plate 158 in said position. The pull of spring 156 on pin 159 tends to depress link 160 and thereby to hold same down upon pin 166, Fig. 13, which projects through slot 167 in link 160, said pin 166 being borne by plate 158.

When operating bar 60 moves forward, the projection 154 on arm 155 of bell-crank 152 causes the plate 145 to move forwardly with said bar, whereby the cam slot 162 presses on pin 161 and thereby moves plate 158 downwardly, thereby extending spring 156, so as to increase the tension of said spring on link 160, and moving the pin 166 to the lowest point of slot 167 in said link, in order to allow said link to descend. Link 160, in its upper part, encircles shaft 21, the interior of its encircling opening being provided with cam slots 168 and 169, Fig. 12, in which pins 170 and 171 ride, said pins being borne by yoke 172, which is fixed to shaft 21. Said yoke 172 bears an arm 173 containing an opening through which shaft 19 extends, and it, also, acts by means of pins 170 and 171, as a lever to rock that shaft During the first part of movement of bar 60, the link 160 is held stationary by latch 174, which is pivoted at 175 to frame 176, said frame being supported by cross-rods 43 and 177 and affording bearings for various shafts and supports for other parts. Spring 178 holds the toe 179 of latch 174 normally in the path of travel of bevel 180 on bar 60, and it, also, holds the notched end 181 of latch 174 in engagement with projection 182 on yoke 172. When the movement of the main operating handle or lever has caused bar 60 to travel so far that bevel 180 thereon engaging the toe 179 of latch 174 causes its notched end 181 to release the projection 182 on yoke 172 at the same time that pin 161 on plate 158 reaches the lower end of cam slot 162 in plate 145, the spring 156 being under tension causes the link 160 to descend until the upper end of slot 167 rests on the pin 166 borne by plate 158, whereby pin 170 is pressed downwardly by the side of slot 168 in link 160, with the result that yoke 172 is tilted or moved in such manner as to rotate shaft 21 and with it arms 20 and 173, thus rocking platen 7 toward the type-faces 102. The rocking of the platen as just described causes an impact of paper 5 against type-faces 102 and consequent printing thereon of the last item set by means of the finger-pieces. The releasing of link 160 as just described occurs before the bar 60 reaches the end of its forward movement, and, therefore, a device is provided which automatically releases the projection 154, Fig. 12, on arm 155 of bell-crank 152 from pushing engagement with projection 146 on plate 145, so as to allow the pin 161 borne by plate 158 to hold the plate 145 stationary while the bar 60 completes the last part of its forward movement, and which, likewise, during the return movement of bar 60, automatically releases the said projection 154 from pulling engagement with projection 146 on plate 145, in order to allow pin 161 to hold the plate 145 stationary while the bar 60 completes the last part of its return movement. This releasing device consists of the following parts: A spring 183, Fig. 12, connects a dog 184 with a dog 185 and holds said dogs normally in engagement with stop pins 186 and 187, respectively, so as to hold the ends of said dogs normally in the path of travel of projection 188 on the arm of bell-crank 152 and, also, in position to support said arm, as best seen in Fig. 12, said dogs 184 and 185 being preferably arranged to face each other and being pivoted at 189 and 190, respectively, to the side of casing 1, and said stop pins 186 and 187 being secured to said casing. When the bar 60 is moved forward, the bell-crank 152 travels with same and thereby causes the projection 188 borne by its arm 155 to engage the shoulder 191 on dog 184, thereby rocking said dog clockwise, Fig. 12. This engagement of projection 188 with shoulder 191 on dog 184 has no effect on the bell-crank 152, but merely pushes the end of said dog out of the path of travel of said projection 188, after which further forward movement of bar 60 causes the projection 188 to ride up the inclined surface 192 on dog 185, thereby rocking bell-crank 152 counter-clockwise, with the result of moving the projection 154 out of pushing engagement with projection 146 on plate 145 at the same time that link 160 is released as hereinabove described. After the projection 188 moves out of engagement with dog 184, the spring 183 returns said dog 184 to its normal position for the purpose hereinafter described. As soon as projection 154 on arm 155 of bell-crank 152 is moved out of pushing engagement with projection 146 on plate 145, the pin 161 borne by plate 158 holds the plate 145 stationary while the bar 60 completes its forward movement. Thereafter, the projection 188, in riding over the end of dog 185, raises said arm 155 so as to cause the projection 154 to pass over projection 146, and, when the bar 60 reaches the end of its forward movement, the projection 188 will have moved out of engagement with the end of dog 185, thus allowing spring 150 to rock the bell-crank 152 clockwise, Fig. 12, whereby projection 154 drops into pulling engagement with the projection 146, in order to cause plate 145 to travel with bar 60 on the return movement of the latter. When the printing operation has been completed and the operating bar 60 has reached the end of its forward movement, as just described, the main operating handle or lever is released by the operator, and, thereupon, spring 193, Fig. 13, exerts its force to return said handle or lever to its initial position. This return movement of the main operating handle or lever rocks the plate 90 clockwise, Fig. 12, whereby the segmental rack 91 on said plate causes the operating bar 60 to return to its initial position. During the first part of the return movement of bar 60, the projection 154 on arm 155 of bell-crank 152 pulls on the projection 146 on plate 145 and thereby causes said plate to travel with said bar, whereby pin 161 borne by plate 158 rides upwardly in cam slot 162, Fig. 13, thus causing the pin 166 borne by said plate 158 to raise the link 160, with the result that the side of cam slot 168 in link 160 presses upwardly against pin 170 and consequently rotates yoke 172 and shaft 21 and, therefore, arms 173 and 20, which movement of said arms returns the platen 7 to its normal or non-printing position. While the platen 7 is being restored to normal position as just described, the bar 60 will have moved the bevel 180, Fig. 12, thereon to such position as to allow the spring 178 to pull the notched end 181 of latch 174 into engagement with the projection 182 borne by yoke 172, whereby said latch prevents said yoke from being rotated to swing the platen 7 to printing position until the bar 60 is again moved forward. The bell-crank 152 travels with bar 60 and thereby moves the projection 188 borne by arm 155 of said bell-crank into engagement with shoulder 194 on dog 185, thereby rocking said dog counter-clockwise, Fig. 12, so as to move the end of said dog out of the path of travel of projection 188, after which said projection passes out of engagement with the end of dog 185, whereupon spring 183 returns said dog to its normal position. Further return movement of bar 60 causes the projection 188 to ride up the inclined surface 195 on dog 184, thereby rocking bell-crank 152 counter-clockwise, Fig. 12, with the result of moving the projection 154 on arm 155 of said bell-crank out of pulling engagement with projection 146 on plate 145 at the same time that pin 161 reaches the upper end of cam slot 162 in plate 145. After the projection 154 is released from pulling engagement with projection 146, the pin 161 holds the plate 145 stationary while the bar 60 completes its return movement, during which time the projection 188 rides over the end of pawl 184 and thereby holds the arm 155 of bell-crank 152 in such position as to cause the projection 154 to pass over projection 146. When the bar 60 reaches the end of its return movement, the projection 188 will have moved out of engagement with the end of dog 184, thus allowing spring 150 to rock the bell-crank 152 clockwise, Fig. 12, whereby projection 154 drops into pushing engagement with projection 146, so as to be in position to cause the plate 145 to travel with bar 60 when the latter is again moved forward. An antifriction roller 196, Fig. 12, is revolubly mounted on pin 197, which is secured to the side of casing 1, and is adapted to afford additional means for supporting plate 145 when the latter travels with bar 60.

The description of the rocking of the platen up to the present point has been of its movement for the purpose of printing items on paper 5. At any time, however, it may be desirable to print the total of a series of items, and for this purpose mechanism is provided for rocking the platen 7 to printing engagement with the "total type" 103. The printing of totals is controlled by the total key 198, Fig. 12. When total key 198 is pressed, it rocks shaft 199, Fig. 12, by means of arm 200, fixed thereto, the shank of total key 198 being pivoted at 201 to said arm 200, and spring 202 normally holding said arm in engagement with stop 203, which is secured to the side of casing 1, thus holding total key 198 in its upper position. Shaft 199 is journaled in the side plates of casing 1. The rocking of shaft 199 by the depression of total key 198 rocks arm 204, which is pivoted at 205 to link 206, Fig. 13, and draws said link toward the operator. Notch 207 in the upper surface of link 206 loops over pin 208, which projects from link 160. Rearward movement of link 206 will, therefore, rock link 160 rearwardly, said link 160 being pivoted at 166, with the result that cam slot 168 moves away from pin 170 while, simultaneously, cam slot 169 moves into engagement with pin 171, which tilts or rotates yoke 172 when link 160 is pulled downwardly by spring 156 when the operating handle or lever is depressed, said tilting of yoke 172 on shaft 21 being in the direction opposite to that in which it is tilted or rotated when platen 7 is to be moved toward the item-printing type-faces, and, as yoke 172 is fixed to shaft 21 and arms 173 and 20 project upwardly from shaft 21 and support the platen shaft 19, the platen is rocked toward the total type-printing faces 103. In order that this operation may be carried out, the total key 198 must be kept depressed during the time when the main operating handle or lever is being pressed down. The return of the platen to the intermediate or non-printing position is accomplished as follows: When the main operating handle or lever and the total key 198 are released, same return to their initial positions under the impulsion, respectively, of springs 193 and 202. The movement of total key 198 to its initial position rotates shaft 199 counter-clockwise, which, by means of arm 204, causes link 206 to travel away from the operator, thus rocking link 160 in such manner as to cause pin 171 to ride out of cam slot 169 and pin 170 to ride into cam slot 168, said link 160 being simultaneously raised by the action of plate 145, Fig. 14, actuated by bar 60, as hereinbefore described, by which means yoke 172 causes shaft 21 to move platen 7 away from the total type-printing faces 103.

From the foregoing, it is believed the operation of the mechanism will be readily understood, and requires no further description.

We claim:

1. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaged from said pinion, said rack containing a cam slot, an arm rigidly mounted on said shaft, a pin projecting from said last-mentioned arm into the slot in said rack for moving said rack into engagement with said pinion and subsequently causing said rack to rotate said pinion, thereby to rotate the platen to bring the printed matter thereon into view.

2. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaged from said pinion, an arm rigidly mounted on said shaft adapted for moving said rack into engagement with said pinion and subsequently causing said rack to rotate said pinion, thereby to rotate the platen to bring the printed matter on the paper into view, and means for preventing movement of said rack to rotate said pinion until same has been moved into engagement with said pinion.

3. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaged from said pinion, an arm rigidly mounted on said shaft adapted for moving said rack into engagement with said pinion and subsequently causing said rack to rotate said pinion, thereby to rotate the platen to bring the printed matter on the paper into view, means for preventing movement of said rack to rotate said pinion until same has been moved into engagement with said pinion, and means for preventing said rack from disengaging said pinion until same is restored to normal position.

4. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, an arm rigidly mounted on said shaft adapted to raise the free end of said rack into engagement with said pinion and subsequently to cause said rack to rotate said pinion, thereby to rotate the platen to bring the printed matter on the paper into view, and a stationary member located in front of the free end of said rack for normally preventing said rack from being moved to rotate said pinion until the free end of said rack is raised into engagement with said pinion.

5. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, a stationary member located in front of the free end of said rack for preventing forward movement of said rack until same is moved into engagement with said pinion, an arcuate plate pivoted to said arm and having its free end normally located behind said stationary member, thereby to prevent forward movement of said rack until same is moved into engagement with said pinion, and an arm rigidly mounted on said shaft adapted successively to raise the free ends of said rack and said plate from behind said stationary member and subsequently to cause said rack to rotate said pinion, thereby to rotate the platen to bring the printed matter on the paper into view.

6. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, a stationary member located in front of the free end of said rack for preventing forward movement of said rack until same is moved into engagement with said pinion, an arcuate plate pivoted to said arm and having its free end normally located behind said stationary member, thereby to prevent forward movement of said rack until same is moved into engagement with said pinion, an arm rigidly mounted on said shaft adapted successively to raise the free ends of said rack and said plate from behind said stationary member and subsequently to cause said rack to rotate said pinion, thereby to rotate the platen to bring the printed matter on the paper into view, and means for rocking said shaft.

7. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, a stationary member located in front of the free end of said rack for preventing forward movement of said rack until same is moved into engagement with said pinion, an arcuate plate pivoted to said arm and having its free end normally located behind said stationary member, thereby to prevent forward movement of said rack until same is moved into engagement with said pinion, an arm rigidly mounted on said shaft adapted successively to raise the free ends of said rack and said plate from behind said stationary member and subsequently to cause said rack to rotate said pinion, thereby to rotate the platen to bring the printed matter on the paper into view, means for rocking said shaft, and means for automatically restoring said rocking means to normal position.

8. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, a stationary member located in front of the free end of said rack for preventing forward movement of said rack until same is moved into engagement with said pinion, an arcuate plate pivoted to said arm and having its free end normally located behind said stationary member, thereby to prevent movement of said rack until same is moved into engagement with said pinion, an arm rigidly mounted on said shaft adapted successively to raise the free ends of said rack and said plate from behind said stationary member and subsequently to cause said rack to rotate said pinion, thereby to rotate the platen to bring the printed matter on the paper into view, means for rocking said shaft, means for automatically restoring said rocking means to normal position, and means for limiting the movement of said rocking means.

9. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, a stationary member located in front of the free end of said rack for preventing forward movement of said rack until same is moved into engagement with said pinion, an arcuate plate pivoted to said arm and having its free end normally located behind said stationary member, thereby to prevent forward movement of said rack until same is moved into engagement with said pinion, an arm rigidly mounted on said shaft adapted successively to raise the free ends of said rack and said plate from behind said stationary member and subsequently to cause said rack to rotate said pinion, thereby to rotate the platen to bring the printed matter on the paper into view, means for rocking said shaft, means for automatically restoring said rocking means to normal position, and means for limiting the movement of said rocking means, said stationary member being adapted to hold said rack temporarily in its advance position.

10. In a calculating machine, the combination of printing means, a revoluble platen coöperative therewith, paper feeding devices for rotating said platen for each printing operation of the platen, a pinion operatively connected with said platen, a shaft, an arm loosely mounted on said shaft, a segmental rack pivoted to said arm and normally disengaging said pinion, said rack containing a cam slot, a stationary member located in front of the free end of said rack for preventing forward movement of said rack until same is moved into engagement with said pinion, an arcuate plate pivoted to said arm and having its free end normally located behind said stationary member thereby to prevent forward movement of said rack until the latter is moved into engagement with said pinion, an arm rigidly mounted on said shaft and bearing a pin, which projects into the cam slots in said rack and said plate, adapted successively to raise the free ends of said rack and said plate from behind said stationary member and subsequently to cause said rack to rotate said pinion, thereby to rotate the platen to bring the printed matter on the paper into view.

11. In a calculating machine, the combination of printing means, a revoluble platen coöperative therewith, paper feeding devices for rotating said platen for each printing operation of the platen, a rock shaft, means operatively connected with said shaft for rotating said platen to bring the printed matter on the paper into view, means for rocking said shaft, and frictional means for holding the paper temporarily in its advance position.

12. In a calculating machine, the combination of printing means, a revoluble platen coöperative therewith, paper feeding devices for rotating said platen for each printing operation of the platen, a rock shaft, means for rocking said shaft, means operatively connected with said shaft for rotating said platen to bring the printed matter on the paper into view, and means for limiting the movement of said shaft.

13. In a calculating machine, the combination of printing means, a revoluble platen coöperative therewith, paper feeding devices for rotating said platen for each printing operation of the platen, a rock shaft, means for rocking said shaft, means operatively connected with said shaft for rotating said platen to bring the printed matter on the paper into view, means for limiting the movement of said shaft, and frictional means for temporarily holding the paper in its advanced position.

14. In a calculating machine, the combination of printing means, a revoluble platen coöperative therewith, paper feeding devices for rotating said platen for each printing operation of the platen, a rock shaft, means for rocking said shaft, means operatively connected with said shaft for rotating said platen to bring the printed matter on the paper into view, means for limiting the movement of said shaft, frictional means for temporarily holding the paper in its advanced position, and means for automatically restoring said rocking means to normal position.

15. In a calculating machine, the combination of printing means, a revoluble platen movable to and from printing position with respect to said means, an operating member, means operated by said member for moving said platen to and from printing position, a rock shaft, means for rocking said shaft, means operatively connected with said shaft for rotating said platen to bring the printed matter on the paper into view, and locking means controlled by said shaft for preventing said member from being operated while said shaft is being rocked.

16. In a calculating machine, the combination of printing means, a revoluble platen movable to and from printing position, a reciprocatory operating bar, means operatively connected with said bar for moving said platen to and from printing position, a rock shaft, means for rocking said shaft, means operatively connected with said shaft for rotating said platen to bring the printed matter on the paper into view, and means controlled by said shaft for preventing said member from being operated while said shaft is being rocked.

17. In a calculating machine, the combination of printing means, a revoluble platen movable to and from printing position, an operating member, means operatively connected with said member for moving said platen to and from printing position, a rock shaft, means for rocking said shaft, and means controlled by said member for rendering said rocking means inoperative while said member is being operated.

18. In a calculating machine, the combination of printing means, a revoluble platen movable to and from printing position, a reciprocatory operating bar, means operatively connected with said bar for moving said platen to and from printing position, a rock shaft, means operatively connected with said shaft for rotating said platen to bring the printed matter on the paper into view, and means controlled by said bar for rendering said rocking means inoperative while said bar is being operated.

19. In a calculating machine, the combination of printing means, a revoluble platen movable to and from printing position, a reciprocatory operating bar, means operatively connected with said bar for moving said platen to and from printing position, a rock shaft, means for rocking said shaft, means operatively connected with said shaft for rotating said platen to bring the printed matter on the paper into view, a cam borne by said shaft, and means actuated by said cam for preventing said bar from being operated while said shaft is being rocked.

20. In a calculating machine, the combination of printing means, a revoluble platen movable to and from printing position, a reciprocatory operating bar, means operatively connected with said bar for moving said platen to and from printing position, a rock shaft, means for rocking said shaft, means operatively connected with said shaft for rotating said platen to bring the printed matter on the paper into view, a cam borne by said shaft, and a pivoted member actuated by said cam for locking said bar in normal position while said shaft is being rocked.

21. In a calculating machine, the combination of printing means, a revoluble platen movable to and from printing position, a reciprocatory operating bar, means operatively connected with said bar for moving said platen to and from printing position, a rock shaft, means for rocking said shaft, means operatively connected with said shaft for rotating said platen to bring the printed matter on the paper into view, a cam borne by said shaft, a pivoted member actuated by said shaft to lock said bar in its normal position while said shaft is being rocked, and means borne by said bar for locking said pivoted member in its normal position while said bar is being operated.

22. In a calculating machine, the combination of printing means, a revoluble platen coöperative therewith, paper feeding devices for rotating said platen for each printing operation of the platen, and a clutch device for operating the platen to advance the paper independently of the paper feeding devices.

23. In a calculating machine, the combination of printing means, a revoluble platen coöperative therewith, paper feeding devices for rotating said platen for each printing operation of the platen, a clutch device for rotating said platen to advance the paper independently of the paper feeding devices, and means for locking said clutch device from operation while the platen is being moved to and from printing position.

24. In a calculating machine, the combination of printing means, a revoluble platen coöperative therewith, paper feeding devices for rotating said platen for each printing operation of the platen, a clutch device for rotating said platen to advance the paper independently of the paper feeding devices, operating means for moving said platen to and from printing position, and means operatively connected with said operating means for locking said clutch device from operation while the platen is being moved to and from printing position.

25. In a calculating device, the combination of printing means, a revoluble platen coöperative therewith, paper feeding devices for rotating said platen for each printing operation of the platen, a clutch device for rotating said platen to advance the paper independently of the paper feeding devices, operating means for moving said platen to and from printing position, and means operatively connected with said operating means for locking said clutch device from operation while the platen is being moved to and from printing position, said clutch device being adapted to lock said operating means from operation while the former is being operated to rotate said platen.

26. In a calculating machine, the combination of printing means, a platen coöperative therewith, a revoluble member controlled by the platen operating means, and means under the control of said member for rotating the platen to advance the paper for each printing operation of the platen.

27. In a calculating machine, the combination of printing means, a platen coöperative therewith, means under the control of the platen operating means for rotating said platen to advance the paper for each printing operation of the platen, and a device under the control of the platen operating means for locking the paper advancing means from operation while the platen is being moved to and from printing position.

28. In a calculating machine, the combination of printing means, a platen coöperative therewith, a revoluble member controlled by the platen operating means, means operatively connected with said member for rotating said platen to advance the paper for each printing operation of the platen, and a device under the control of said member for locking the paper advancing means from operation while the platen is being moved to and from printing position.

29. In a calculating machine, the combination of printing means, a platen coöperative therewith, a rock shaft supporting said platen for swinging movement, means for rocking said shaft to move said platen to and from printing position, and a member revoluble on said shaft and controlled by the platen operating means for rotating said platen to advance the paper for each printing operation of the platen.

30. In a calculating machine, the combination of printing means, a platen coöperative therewith, a rock shaft supporting said platen for swinging movement, means for rocking said shaft to move said platen to and from printing position, means supported by said shaft and controlled by the platen operating means for rotating said platen to advance the paper for each printing operation of the platen, and a device controlled by the platen operating means for locking the paper advancing means from operation while the platen is being moved to and from printing position.

31. In a calculating machine, the combination of printing means, a ratchet revoluble on said shaft, a feed pawl coöperative with said ratchet, a pinion operatively connected with said platen and meshing with said gear, means under the control of the platen operating means for actuating said feed pawl to rotate the platen to advance the paper for each printing operation of the platen, and a device coöperative with said pinion for preventing the platen from spinning.

32. In a calculating machine, the combination of printing means, a platen having means for moving it to and from printing position with respect to the printing means, a revoluble member controlled by the platen operating means, a device under the control of said member for rotating said platen to advance the paper for each printing operation of the platen, and a latch operatively connecting said device with said member.

33. In a calculating machine, the combination of printing means, a platen having means for moving it to and from printing position with respect to the printing means, a revoluble member controlled by the platen operating means, a device under the control of said member for rotating said platen to advance the paper for each printing operation of the platen, a latch operatively connecting said device with said member, and means for releasing said latch from operative connection with said member after each paper feeding operation.

34. In a calculating machine, the combination of printing means, a platen having means for moving it to and from printing position with respect to the printing means, a revoluble member controlled by the platen operating means, a device under the control of said member for rotating said platen to advance the paper for each printing operation of the platen, a latch operatively connecting said device with said member, means for releasing said latch from operative connection with said member after each paper feeding operation, and means for automatically restoring said device to normal position after each paper feeding operation.

35. In a calculating machine, the combination of printing means, a platen having means for moving it to and from printing position with respect to the printing means, means under the control of the platen operating means for rotating said platen to advance the paper for each printing operation of the platen, a cam under the control of the platen operating means, and means under the control of said cam for locking the paper advancing means from operation while the platen is being moved to and from printing position.

36. In a calculating machine, the combination of printing means, a platen having means for moving it to and from printing position with respect to the printing means, means under the control of the platen operating means for rotating said platen to advance the paper for each printing operation of the platen, a cam under the control of the platen operating means, a reciprocatory member under the control of said cam, and a device under the control of said member for locking the paper advancing means from operation while the platen is being moved to and from printing position.

37. In a calculating machine, the combination of printing means, a platen coöperative therewith, a ratchet operatively connected with said platen, a feed pawl coöperative with said ratchet, means for holding said pawl normally out of engagement with said ratchet, and means under the control of the platen operating means for actuating said feed pawl to rotate the platen to advance the paper for each printing operation of the platen.

In testimony whereof we hereunto affix our signatures in the presence of two witnesses.

ALBERT J. MEIER.
WILLIAM L. SWIFT.
EDWIN L. RELLER.

Witnesses:
  GLADYS WALTON,
  NANCY C. THOMAS.

Copies of this patent may be obtained for five cents each, by addressing the "Commissioner of Patents, Washington, D. C."